United States Patent
Shanahan

(10) Patent No.: US 8,452,272 B2
(45) Date of Patent: *May 28, 2013

(54) METHODS AND APPARATUSES FOR PROGRAMMING USER-DEFINED INFORMATION INTO ELECTRONIC DEVICES

(75) Inventor: Michael E. Shanahan, Nyack, NY (US)

(73) Assignee: Solocron Media, LLC, Tyler, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,013

(22) Filed: Sep. 13, 2012

(65) Prior Publication Data

US 2013/0007820 A1    Jan. 3, 2013

Related U.S. Application Data

(63) Continuation of application No. 13/471,161, filed on May 14, 2012, which is a continuation of application No. 13/316,203, filed on Dec. 9, 2011, which is a continuation of application No. 12/128,991, filed on May 29, 2008, now Pat. No. 8,170,538, which is a continuation of application No. 11/633,142, filed on Dec. 2, 2006, now Pat. No. 7,555,317, which is a continuation of application No. 10/600,975, filed on Jun. 20, 2003, now Pat. No. 7,149,509, which is a continuation of application No. 09/518,846, filed on Mar. 3, 2000, now abandoned.

(60) Provisional application No. 60/169,158, filed on Dec. 6, 1999.

(51) Int. Cl.
*H04M 3/00* (2006.01)

(52) U.S. Cl.
USPC .......................... 455/418; 455/457; 455/567

(58) Field of Classification Search
USPC .................. 455/418, 419, 415, 557, 566, 567
See application file for complete search history.

(56) References Cited

U.S. PATENT DOCUMENTS

| | | | |
|---|---|---|---|
| 4,866,766 A | 9/1989 | Mitzlaff | |
| 4,868,561 A | 9/1989 | Davis | |
| 5,220,420 A | 6/1993 | Hoarty et al. | |
| 5,247,347 A | 9/1993 | Litteral et al. | |
| 5,253,275 A | 10/1993 | Yurt et al. | |
| 5,262,275 A | 11/1993 | Fan | |

(Continued)

FOREIGN PATENT DOCUMENTS

| | | |
|---|---|---|
| CA | 2436872 | 10/2007 |
| EP | 0851649 A2 | 7/1998 |

(Continued)

OTHER PUBLICATIONS

U.S. Appl. No. 09/518,846, filed Mar. 3, 2000, Shanahan, Michael.

(Continued)

*Primary Examiner* — Temica M Beamer
(74) *Attorney, Agent, or Firm* — Knobbe, Martens, Olson & Bear, LLP

(57) ABSTRACT

A device for programming user-defined information into an electronic device is provided. The programmer allows a user to program customized information, such as user-selected audio, video, or Internet access information into his or her programmable device. Such electronic devices include wireless telephones, pagers, and personal digital assistants. The programmer allows a user to, among other things, customize the device to suit his or her particular taste.

14 Claims, 13 Drawing Sheets

U.S. PATENT DOCUMENTS

| | | |
|---|---|---|
| 5,262,875 A | 11/1993 | Mincer et al. |
| 5,341,474 A | 8/1994 | Gelman et al. |
| 5,414,444 A | 5/1995 | Britz |
| 5,414,751 A | 5/1995 | Yamada |
| 5,428,606 A | 6/1995 | Moskowitz |
| 5,440,336 A | 8/1995 | Buhro et al. |
| 5,442,749 A | 8/1995 | Northcutt et al. |
| 5,452,354 A | 9/1995 | Kyronlahti et al. |
| 5,461,666 A | 10/1995 | McMahan et al. |
| 5,479,477 A | 12/1995 | McVey et al. |
| 5,479,510 A | 12/1995 | Olsen et al. |
| 5,481,599 A | 1/1996 | MacAllister et al. |
| 5,483,580 A | 1/1996 | Brandman et al. |
| 5,483,581 A | 1/1996 | Hird et al. |
| 5,485,370 A | 1/1996 | Moss et al. |
| 5,486,686 A | 1/1996 | Zdybel, Jr. et al. |
| 5,487,671 A | 1/1996 | Shpiro et al. |
| 5,490,210 A | 2/1996 | Sasso |
| 5,490,251 A | 2/1996 | Clark et al. |
| 5,499,288 A | 3/1996 | Hunt et al. |
| 5,508,733 A | 4/1996 | Kassatly |
| 5,510,777 A | 4/1996 | Pilc et al. |
| 5,513,272 A | 4/1996 | Bogosian, Jr. |
| 5,517,605 A | 5/1996 | Wolf |
| 5,524,141 A | 6/1996 | Braun et al. |
| 5,526,620 A | 6/1996 | Hallsten |
| 5,528,281 A | 6/1996 | Grady et al. |
| 5,530,852 A | 6/1996 | Meske, Jr. et al. |
| 5,533,115 A | 7/1996 | Hollenbach et al. |
| 5,534,855 A | 7/1996 | Shockley et al. |
| 5,537,586 A | 7/1996 | Amram et al. |
| 5,541,917 A | 7/1996 | Farris |
| 5,542,046 A | 7/1996 | Carlson et al. |
| 5,544,255 A | 8/1996 | Smithies et al. |
| 5,544,322 A | 8/1996 | Cheng et al. |
| 5,548,726 A | 8/1996 | Pettus |
| 5,550,557 A | 8/1996 | Kapoor et al. |
| 5,550,577 A | 8/1996 | Verbiest et al. |
| 5,550,578 A | 8/1996 | Hoarty et al. |
| 5,550,863 A | 8/1996 | Yurt et al. |
| 5,550,976 A | 8/1996 | Henderson et al. |
| 5,551,021 A | 8/1996 | Harada et al. |
| 5,553,311 A | 9/1996 | McLaughlin et al. |
| 5,557,675 A | 9/1996 | Schupak |
| 5,561,688 A | 10/1996 | Jones, Jr. |
| 5,563,649 A | 10/1996 | Gould et al. |
| 5,566,353 A | 10/1996 | Cho et al. |
| 5,568,181 A | 10/1996 | Greenwood et al. |
| 5,570,126 A | 10/1996 | Blahut et al. |
| 5,572,571 A | 11/1996 | Shirai |
| 5,577,190 A | 11/1996 | Peters |
| 5,583,763 A | 12/1996 | Atcheson et al. |
| 5,598,461 A | 1/1997 | Greenberg |
| 5,600,712 A | 2/1997 | Hanson et al. |
| 5,606,597 A | 2/1997 | Newland |
| 5,608,786 A | 3/1997 | Gordon |
| 5,612,682 A | 3/1997 | DeLuca et al. |
| 5,613,012 A | 3/1997 | Hoffman et al. |
| 5,613,190 A | 3/1997 | Hylton |
| 5,613,191 A | 3/1997 | Hylton et al. |
| 5,619,247 A | 4/1997 | Russo |
| 5,623,531 A | 4/1997 | Nilssen |
| 5,625,404 A | 4/1997 | Grady et al. |
| 5,625,405 A | 4/1997 | DuLac et al. |
| 5,644,354 A | 7/1997 | Thompson et al. |
| 5,661,802 A | 8/1997 | Nilssen |
| 5,675,738 A | 10/1997 | Suzuki et al. |
| 5,677,905 A | 10/1997 | Bigham et al. |
| 5,680,325 A | 10/1997 | Rohner |
| 5,687,227 A | 11/1997 | Cohrs et al. |
| 5,689,825 A | 11/1997 | Averbuch et al. |
| 5,694,455 A | 12/1997 | Goodman |
| 5,724,411 A | 3/1998 | Eisdorfer et al. |
| 5,727,047 A | 3/1998 | Bentley et al. |
| 5,732,216 A | 3/1998 | Logan et al. |
| 5,790,423 A | 8/1998 | Lau et al. |
| 5,793,413 A | 8/1998 | Hylton et al. |
| 5,793,980 A | 8/1998 | Glaser et al. |
| 5,796,728 A | 8/1998 | Rondeau et al. |
| 5,799,063 A | 8/1998 | Krane |
| 5,828,956 A | 10/1998 | Shirai |
| 5,835,495 A | 11/1998 | Ferriere |
| 5,842,124 A | 11/1998 | Kenagy et al. |
| 5,870,683 A | 2/1999 | Weils et al. |
| 5,880,770 A | 3/1999 | Iicisin et al. |
| 5,884,262 A | 3/1999 | Wise et al. |
| 5,907,604 A | 5/1999 | Hsu |
| 5,915,001 A | 6/1999 | Uppaluru |
| 5,926,624 A | 7/1999 | Katz et al. |
| 5,926,756 A | 7/1999 | Piosenka et al. |
| 5,930,703 A | 7/1999 | Cairns |
| 5,933,328 A | 8/1999 | Wallace et al. |
| 5,940,752 A | 8/1999 | Henrick |
| 5,940,775 A | 8/1999 | Kim |
| 5,943,046 A | 8/1999 | Cave et al. |
| 5,948,059 A | 9/1999 | Woo et al. |
| 5,952,918 A | 9/1999 | Ohayon |
| 5,953,408 A | 9/1999 | Blanvillain et al. |
| 5,953,638 A | 9/1999 | Flood et al. |
| 5,963,877 A | 10/1999 | Kobayashi |
| 5,983,069 A | 11/1999 | Cho et al. |
| 5,986,690 A | 11/1999 | Hendricks |
| 5,987,323 A | 11/1999 | Huotari |
| 5,999,094 A | 12/1999 | Nilssen |
| 5,999,599 A | 12/1999 | Shaffer et al. |
| 6,002,720 A | 12/1999 | Yurt et al. |
| 6,002,761 A | 12/1999 | Sremac |
| 6,014,569 A | 1/2000 | Bottum |
| 6,018,654 A | 1/2000 | Valentine et al. |
| 6,018,656 A | 1/2000 | Shirai |
| 6,035,018 A | 3/2000 | Kaufman |
| 6,035,189 A | 3/2000 | Ali-Vehmas et al. |
| 6,058,161 A | 5/2000 | Anderson et al. |
| 6,073,003 A | 6/2000 | Nilssen |
| 6,075,998 A | 6/2000 | Morishima |
| 6,088,730 A | 7/2000 | Kato et al. |
| 6,091,947 A | 7/2000 | Summer |
| 6,094,587 A | 7/2000 | Armanto et al. |
| 6,101,242 A | 8/2000 | McAllister et al. |
| 6,122,526 A | 9/2000 | Parulski et al. |
| 6,137,525 A | 10/2000 | Lee et al. |
| 6,138,006 A | 10/2000 | Foti |
| 6,140,568 A | 10/2000 | Kohler |
| 6,144,722 A | 11/2000 | Anderson et al. |
| 6,151,491 A | 11/2000 | Farris et al. |
| 6,163,711 A | 12/2000 | Juntunen et al. |
| 6,167,130 A | 12/2000 | Rosen |
| 6,167,278 A | 12/2000 | Nilssen |
| 6,179,682 B1 | 1/2001 | Plain et al. |
| 6,188,909 B1 | 2/2001 | Alanara et al. |
| 6,192,340 B1 | 2/2001 | Abecassis |
| 6,198,941 B1 | 3/2001 | Aho et al. |
| 6,219,413 B1 | 4/2001 | Burg |
| 6,222,838 B1 | 4/2001 | Sparks et al. |
| 6,226,532 B1 | 5/2001 | Kim et al. |
| 6,229,990 B1 | 5/2001 | Toshida |
| 6,233,682 B1 | 5/2001 | Fritsch |
| 6,240,391 B1 | 5/2001 | Ball et al. |
| 6,243,375 B1 | 6/2001 | Speicher |
| 6,253,061 B1 | 6/2001 | Helferich |
| 6,256,378 B1 | 7/2001 | Iggulden et al. |
| 6,275,234 B1 | 8/2001 | Iwaki |
| 6,308,086 B1 | 10/2001 | Yoshino |
| 6,366,791 B1 | 4/2002 | Lin et al. |
| 6,385,305 B1 | 5/2002 | Gerszberg et al. |
| 6,389,124 B1 | 5/2002 | Schnarel et al. |
| 6,392,640 B1 | 5/2002 | Will |
| 6,400,958 B1 | 6/2002 | Isomursu et al. |
| 6,418,330 B1 | 7/2002 | Lee |
| 6,449,359 B1 | 9/2002 | Luzzatto et al. |
| 6,477,580 B1 | 11/2002 | Bowman-Amuah |
| 6,483,531 B1 | 11/2002 | Ryu |
| 6,496,692 B1 | 12/2002 | Shanahan |
| 6,501,967 B1 | 12/2002 | Makela et al. |
| 6,564,056 B1 | 5/2003 | Fitzgerald |
| 6,599,147 B1 | 7/2003 | Mills et al. |
| 6,603,985 B1 | 8/2003 | Ichihashi |

| | | |
|---|---|---|
| 6,718,021 B2 | 4/2004 | Crockett et al. |
| 6,720,969 B2 | 4/2004 | Lavelle et al. |
| 6,728,531 B1 | 4/2004 | Lee et al. |
| 6,754,509 B1 | 6/2004 | Khan et al. |
| 6,778,179 B2 | 8/2004 | Lavelle et al. |
| 6,829,618 B1 | 12/2004 | Abraham et al. |
| 6,831,617 B1 | 12/2004 | Miyauchi et al. |
| 6,845,398 B1 | 1/2005 | Galensky et al. |
| 6,848,011 B2 | 1/2005 | Park et al. |
| 6,871,048 B2 | 3/2005 | Takagaki |
| 6,928,468 B2 | 8/2005 | Leermakers |
| 7,013,006 B1 | 3/2006 | Tischer |
| 7,020,497 B2 | 3/2006 | Deeds |
| 7,031,453 B1 | 4/2006 | Busardo et al. |
| 7,035,675 B2 | 4/2006 | Yamada |
| 7,065,342 B1 | 6/2006 | Rolf |
| 7,088,990 B1 | 8/2006 | Isomursu et al. |
| 7,113,981 B2 | 9/2006 | Slate |
| 7,119,268 B2 | 10/2006 | Futamase et al. |
| 7,119,368 B2 | 10/2006 | Park et al. |
| 7,149,509 B2 | 12/2006 | Shanahan |
| 7,161,081 B2 | 1/2007 | Futamase et al. |
| 7,203,523 B2 | 4/2007 | Ito |
| 7,209,900 B2 | 4/2007 | Hunter et al. |
| 7,257,395 B2 | 8/2007 | Shanahan |
| 7,289,798 B2 | 10/2007 | Shanahan |
| 7,295,864 B2 | 11/2007 | Shanahan |
| 7,319,866 B2 | 1/2008 | Shanahan |
| 7,555,317 B2 | 6/2009 | Shanahan |
| 7,620,427 B2 | 11/2009 | Shanahan |
| 7,742,759 B2 | 6/2010 | Shanahan |
| 8,170,538 B2 | 5/2012 | Shanahan |
| 8,224,394 B2 | 7/2012 | Shanahan |
| 8,249,572 B2 | 8/2012 | Shanahan |
| 8,326,278 B2 | 12/2012 | Shanahan |
| 2004/0005880 A1 | 1/2004 | Shanahan |
| 2004/0073591 A1 | 4/2004 | Giacalone |
| 2004/0148226 A1 | 7/2004 | Shanahan |
| 2005/0054379 A1 | 3/2005 | Cao et al. |
| 2005/0086128 A1 | 4/2005 | Shanahan |
| 2007/0099604 A1 | 5/2007 | Shanahan |
| 2007/0099605 A1 | 5/2007 | Shanahan |
| 2008/0182619 A1 | 7/2008 | Shanahan |
| 2008/0287115 A1 | 11/2008 | Shanahan |
| 2009/0131105 A1 | 5/2009 | Shanahan |
| 2012/0084395 A1 | 4/2012 | Shanahan |
| 2012/0214453 A1 | 8/2012 | Shanahan |
| 2012/0226777 A1 | 9/2012 | Shanahan |

FOREIGN PATENT DOCUMENTS

| | | |
|---|---|---|
| GB | 2343084 A | 4/2000 |
| JP | 09205471 | 5/1997 |
| JP | 10173737 A2 | 6/1998 |
| JP | 2001404867 A | 2/2001 |
| JP | 2001195068 | 7/2001 |
| WO | WO 98/11487 | 3/1998 |
| WO | WO 99/28897 | 6/1999 |
| WO | WO 99/43136 | 8/1999 |
| WO | WO 00/36857 | 6/2000 |
| WO | WO 00/38340 | 6/2000 |
| WO | WO 00/79770 | 12/2000 |
| WO | WO 01/41411 A2 | 6/2001 |
| WO | WO 0141403 | 6/2001 |

OTHER PUBLICATIONS

U.S. Appl. No. 13/587,428, filed Aug. 16, 2012, Shanahan, Michael.
Canadian Office Action issued by the Canadian Patent Office on Apr. 21, 2004, in connection with Canadian App. No. 2,436,872 (3 pages).
Canadian Office Action issued by the Canadian Patent Office on Dec. 29, 2004, in connection with Canadian App. No. 2,436,872 (2 pages).
Canadian Office Action issued by the Canadian Patent Office on Mar. 31, 2005, in connection with Canadian App. No. 2,492,727 (3 pages).
Canadian Office Action issued by the Canadian Patent Office on Sep. 19, 2006, in connection with Canadian App. No. 2,436,872 (2 pages).
Canadian Office Action issued by the Canadian Patent Office on Sep. 28, 2005, in connection with Canadian App. No. 2,436,872 (2 pages).
Frere-Jones, "Ring My Bell", The New Yorker, Mar. 7, 2005. http://www.newyorker.com/archive/2005/03/07/050307crmu_music?printable=true.
International Preliminary Report on Patentability issued Mar. 25, 2002, issued inconnection with International Patent Appln. No. PCT/US00/32920 (6 pages).
International Search Report of the International Searching Authority mailed Mar. 20, 2002, issued in connection with International Patent Appln. No. PCT/US00/32920 (3 pages).
Peremulter, "First Ever MEF Special Recognition Award Goes to the Pioneer of the Mobile Ringtone Business", MEFMobile, www.mefmobile.org/index.php?id=391.
SGS Thompson Microelectronics ST 5092 Datasheet, Jun. 1997, pp. 1-29.
Takeishi, et al., "Mobile Innovation and the Music Business in Japan: The Case of Ringing Tone Melody", Institute of Innovation Research—Hitotsubashi University, May 2003, http://www.newyorker.com/archive/2005/03/07/050307crmu_music?printable=true.
Written Opinion of the International Searching Authority mailed Nov. 21, 2001, issued in connection with International Patent Appln. No. PCT/US00/32920 (7 pages).
U.S. Appl. No. 13/614,333, filed Sep. 13, 2012, Shanahan, Michael.
U.S. Appl. No. 13/725,687, filed Dec. 21, 2012, Shanahan, Michael.
U.S. Appl. No. 13/725,927, filed Dec. 21, 2012, Shanahan, Michael.

METHODS AND APPARATUSES FOR PROGRAMMING USER-DEFINED INFORMATION INTO ELECTRONIC DEVICES

CROSS-REFERENCE TO RELATED APPLICATIONS

This application is a continuation of U.S. patent application Ser. No. 13/471,161, filed May 14, 2012, which is a continuation of U.S. patent application Ser. No. 13/316,203, filed Dec. 9, 2011, which is a continuation of U.S. patent application Ser. No. 12/128,991, filed May 29, 2008, now U.S. Pat. No. 8,170,538, which is a continuation of U.S. patent application Ser. No. 11/633,142, filed Dec. 2, 2006, now U.S. Pat. No. 7,555,317, which is a continuation of U.S. patent application Ser. No. 10/600,975, filed on Jun. 20, 2003, now U.S. Pat. No. 7,149,509, which is a continuation of U.S. patent application Ser. No. 09/518,846, filed Mar. 3, 2000, now abandoned, which claims priority from U.S. Provisional Patent Application No. 60/169,158, filed Dec. 6, 1999, each of which is hereby incorporated herein by reference in its entirety.

BACKGROUND OF THE INVENTION

1. Field of the Invention

This application relates to electronic devices, and more particularly to a programming apparatus that allows users to program user-defined information into their electronic device.

2. Related Art

There are many types of electronic devices available to consumers today that have the ability to produce both audio sounds and video displays. Many of these devices provide users with the ability to select and play a particular piece of audio or video. A television viewer, for example, may tune to a TV channel and watch a particular program, or connect a VCR or DVD player to the television in order to view a specific program not currently being broadcast. Similarly, an audio system user may tune a receiver to a particular radio station to hear a certain genre of music, or connect a CD or tape player to the system in order to hear specific pieces of music. In both cases, the audio and video is user-selectable.

Currently, however, there are many electronic products that offer an audio/video playing capability that are not fully user-programmable. Users of such devices (e.g., wireless or cordless telephones, pagers, personal digital assistants (PDAs), hand-held computers and the like) have to choose from a limited selection of pre-programmed information (e.g., audio clips, video clips or frames, etc.) placed there by the manufacturer. This severely limits the user's ability to customize the device to suit his or her particular taste. Furthermore, most pre-programmed audio tends to be rather generic and can be confusing when a device of a nearby user generates a sound similar to or the same as that of another user's device. Although a programmable memory within many such electronic devices could support user-defined audio, currently, no system exists for programming such information into an electronic device.

The same is true for user-defined video. For example, certain types of user-defined video information, such as video clips, frames, and other digital or analog images could be programmed into an electronic device (e.g., PDA, wireless phone, or any portable display device) and displayed at a time of the user choosing. Although a programmable memory within such a device could support user-defined video, currently, no system exists for programming such information into the device.

SUMMARY OF THE INVENTION

It is therefore an object of the present invention to provide an apparatus that allows a user to program user-defined audio information into a programmable electronic device.

It is a further object of the present invention to provide an apparatus that allows a user to program user-defined video information into a programmable electronic device.

These and other objects of the present invention are accomplished by providing methods apparatuses that allow a user to program user-defined information into his or her electronic device. In one embodiment of the present invention, the programming apparatus includes processing circuitry and first and second communications links. In operation, a user selects a piece of information from a source such as a computer disk drive, the Internet, or a remote database using the first communications link. The programming apparatus may download this information and compare its format with that required by the programmable device to determine format compatibility. If the two formats are compatible, the programming apparatus may download the selected information into the programmable device. If the formats are not compatible, the programming apparatus may convert the downloaded file to a format compatible with that required by the programmable electronic device. The programming apparatus may also provide the user with an opportunity to edit the converted file. Once editing is complete, the resulting file may then be programmed into the programmable device for subsequent use.

In another aspect of the invention, a user may send customized information such as an audio or video file called a "signature" when placing a telephone call This feature allows a user to select and send a signature file to the person receiving the telephone call such that the person receiving the call is alerted by that file.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIG. 4b shows an alternate network embodiment of the computer based implementation in shown in FIG. 4a.

DETAILED DESCRIPTION OF THE PREFERRED EMBODIMENT

Figure 1:
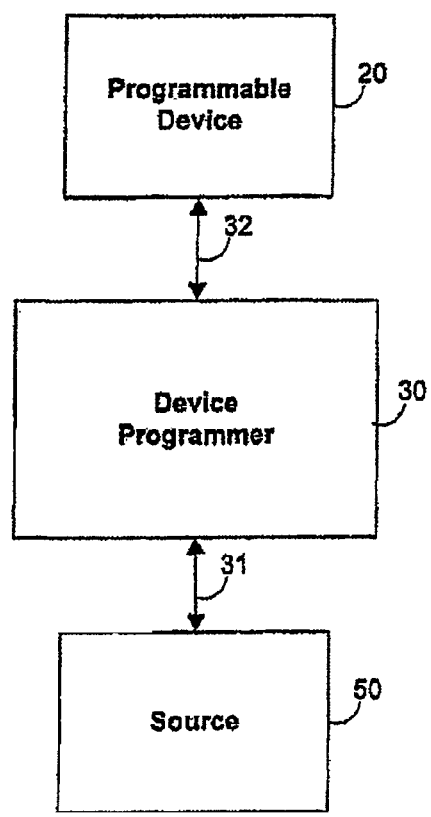
FIG. 1 is a generalized block diagram of a system for programming user-defined information into an electronic device in accordance with one embodiment of the present invention.

FIG. 1 shows a block diagram of a system 10 for programming user-defined information (e.g., audio, video, or Internet access information, etc.) into an electronic device in accordance with one embodiment of the present invention. As shown in FIG. 1, system 10 generally includes a programmable electronic device 20, a device programmer 30, and a source 50. Programmer 30 is connected to source 50 via link 31, and to device 20 via link 32.

Programmable device 20 may be any portable electronic device (e.g., a wireless telephone, a pager, a handheld computer, personal digital assistant (PDA), etc.). Device 20 may also be any device which integrates some or all of the functions of such devices into one device. For example, device 20 may be a PDA capable of making wireless telephone calls, a PDA with paging functions, a wireless telephone with some PDA or paging functions, a handheld or notebook computer with some or all of the functions of a PDA, a pager, and a telephone, etc.

In FIG. 1, links 31 and 32 may be, for example, communications links (e.g., serial ports, parallel ports, universal serial buses (USB), RS232, GPIB, etc.), modems (e.g., any suitable analog or digital modems, cellular modems, or cable modems), a network interface link (e.g., Ethernet links, token ring links, etc.), wireless communications links (e.g., cellular telephone links, wireless Internet links, infrared links, etc.), or any other suitable hard-wired or wireless Internet or communications links.

Source 50 may be any device or combination of devices suitable for providing user-defined information to programmer 30 (e.g., the Internet, an optical disc player (CD, DVD), a cassette player, a VCR, a digital camera, or any suitable storage device containing computer programs or files, etc.).

In operation, a user may choose certain information, such as Internet configuration information, an audio sample of a popular song, a video clip or frame, etc., that is available from source 50 and transfer it to programmer 30. Programmer 30 may then process this information into a suitable format (or may simply route the information if no format conversion is required), and program it into a programmable memory within device 20 (not shown). Device 20 may then retrieve this information when a certain event occurs (e.g., when receiving an incoming telephone call, browsing the Internet, or when programmed to do so by a user, etc.).

Programmer 30 may also coordinate or perform certain functions related to the routing and storing of information within device 20. For example, programmer 30 may communicate with (or simply search) device 20 to find available memory locations in which to store the user-defined information. Programmer 30 may also communicate with device 20 to determine which format the incoming information should be converted to so that the information is compatible with the downloading requirements of device 20. For audio files, this may include, but is not limited to, converting to or from any of the following format types: analog; MIDI; MPEG; PCM; Windows Media Audio Code (WMA); WAV; or Adaptive Transform Acoustic Coding (ATRAC), or to or from any other suitable audio format, etc. For video files, this may include, but is not limited to, converting to or from any of the following format types: analog; JPEG; MPEG; GIF; AVI, or to or from any other suitable video format, etc. Text files may include, for example, HTML files, Wireless Markup Language (WML) files, WordPerfect™ files, Microsoft Office™ files, or any other suitable text files.

If multiple blocks of information are being programmed into device 20, programmer 30 may "tag" the different blocks so that device 20 and/or a user may distinguish among the different blocks stored therein. After the information has been provided, programmer 30 may communicate with device 20 to confirm that the information has been correctly received.

Figure 2:
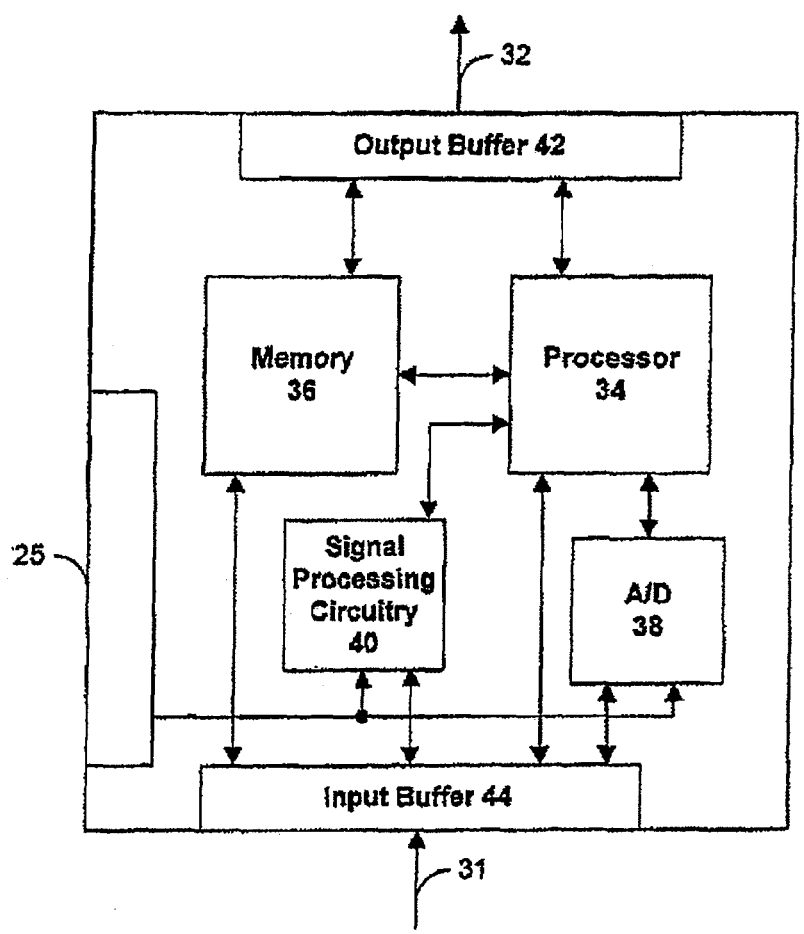
FIG. 2 is a schematic diagram of a programmer constructed in accordance with one possible embodiment of the present invention.

A more detailed diagram of one possible embodiment of programmer 30 is illustrated in FIG. 2. As illustrated, programmer 30 may include a transducer 25, a processor 34, a programmable memory 36, an analog-to-digital (ND) converter 38, signal processing circuitry (SPC) 40, an output buffer 42, and an input buffer 44. Generally speaking, processor 40 controls the operation of programmer 30. Programmer 30 may be configured to receive and process both analog and digital signals. It may also acquire acoustic signals via transducer 25 (if installed).

In operation, programmer 30 may download certain user-selected information from source 50 via link 31. This information, such as audio or video files, in the form of electronic signals, may be received from link 31 and directed to input buffer 44. As mentioned above, these signals may need to be processed in order to be compatible with the format required by programmable device 20. For example, if analog input signals are received at input buffer 44 and device 20 requires a digital format, the analog signals may be routed to ND converter 38 for conversion into a suitable digital form (e.g., into PCM, PAM, etc.). Further processing into another digital format (e.g., MP3, ATRAC, WMA, etc.) may be accomplished by routing the converted signals to SPC 40 or processor 34 (discussed in more detail below). On the other hand, if digital input signals are received at input buffer 44 and device 20 requires analog signals, the digital signals may be routed to SPC 40 or to a dedicated digital-to-analog (D/A) converter (not shown) for conversion to the analog domain.

Processor 34 may route incoming signals from source 50 to memory 36, SPC 40, or directly to output buffer 42 depending on the circumstances. For example, some or all of the input signals received from source 50 may require further processing to meet the downloading specifications of device 20. In this case, the incoming signals that require processing may be routed to SPC 40 for such processing. For example, incoming MP3 or WMA signals may be routed to SPC 40 and converted to ATRAC format (or vice-versa). Once this conversion is complete, the resulting information may be stored in memory 36, or routed to output buffer 42 for programming in device 20. Input signals that do not require a format change may be routed directly from input buffer 44 to memory 36, or output buffer 42. Although not shown in FIG. 2, programmer 30 preferably has a display screen and a data input device, such as a keyboard associated with it so that a user may, among other things, browse and select files, monitor file transfers, and ensure that device 20 has properly received the selected files.

In one embodiment of the present invention, SPC 40 may be programmable so that the conversion and processing protocols contained therein may be periodically updated. Furthermore, in some embodiments, processor 34 may be programmed via software routines in programmable memory 36 to perform some or all of the functions of SPC 40. In this case, an SPC of reduced processing capacity may be used or SPC 40 may be removed altogether from programmer 30.

Audio signals may also be acquired and processed by programmer 30. Transducer 25 may acquire an acoustic signal from a stereo or other audio source and convert it to an electrical signal. This electrical signal may then be processed in a way similar to the way the above-described analog signal was processed. That is, the electrical signal may be routed to ND converter 38 and/or SPC 40 and then stored in memory 36 or output buffer 42, for example.

Figure 3:
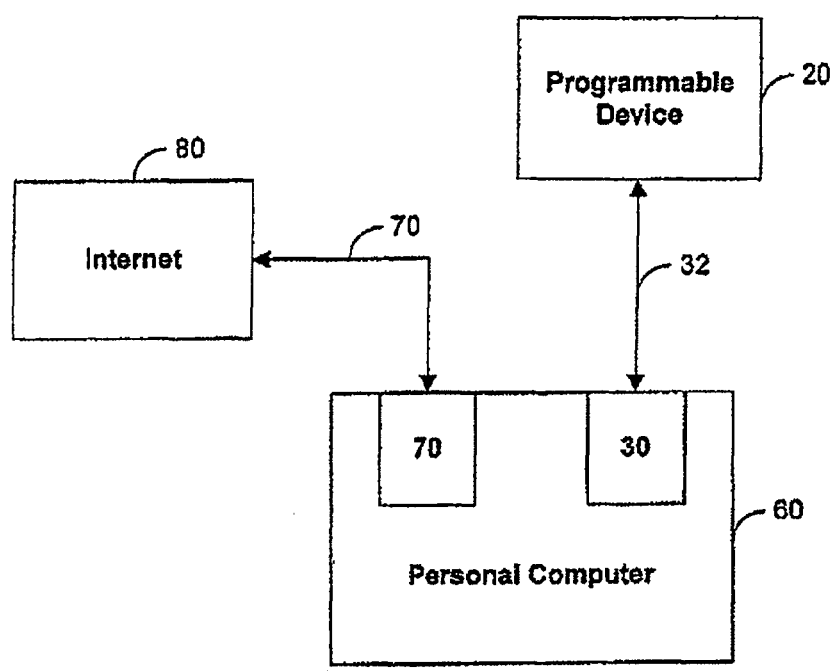
FIG. 3 shows a computer based implementation of a programmer constructed in accordance with one embodiment of the present invention.

It will be understood that the generalized system shown in FIG. 1 may be implemented in many ways. For example, as shown in FIG. 3, system 100 may be implemented using a computer-based architecture. In this case, some or all of programmer 30 may be installed in or connected to a computer, such as a personal computer. For example, in FIG. 3, programmer 30 may be installed in an expansion slot and connected to an interface bus such as an ISA or PCI bus (not shown) in computer 60. In this configuration, programmer 30 may receive user-defined information via the interface bus in computer 60 and operate as described above with the interface bus acting as part of link 31. Some or all of programmer 30 may also be external to computer 60 and connected to it via a link similar to link 31 (not shown). Furthermore, in certain embodiments, some of the functions of programmer 30 may be distributed between computer 60 and programmer 30. For example, programmer 30 may be constructed such that it partially or filly relies on the processing capability of computer 60. In this type of embodiment, programmer 30 may be constructed without processor 34 or with a processor of reduced capacity. Programmer 30 may also be constructed such that it partially or fully relies on the memory capacity of computer 60. Moreover, signal processing functions such as those performed by SPC 40 could also be fully or partially carried out by circuitry or software resident within computer 60.

As shown in FIG. 3, computer 60 may be connected to Internet 80 through link 70. Link 70 may be, for example, a modem (e.g., any suitable analog or digital modem, cellular modem, or cable modem), a network interface link (e.g., an Ethernet link, token ring link, etc.), a wireless communications link (e.g., a wireless telephone link, a wireless Internet link, an infrared link, etc.), or any other suitable hard-wired or wireless communications link. With this configuration, a user may download information from Internet 80 (e.g., using electronic distribution (ED) services) and/or from a disc drive or other devices (not shown) connected to computer 60 and program that information into device 20 (via programmer 30 and link 32).

It will be understood, of course, that computer 60, with a suitable communications link, such as link 32, may be programmed with software to function as programmer 30. In this way, a user may take advantage of the fact that many of the components of programmer 30 are resident within computer 60. For example, computer 60 may contain a processor, such as processor 34 and programmable memory circuitry such as memory 36. Computer 60 may also include signal processing circuitry such as SPC 40, or software that instructs processor 34 to perform the necessary format conversions. Computer 60 may include circuitry similar to input buffer 44 and output buffer 42. Such circuitry may include random access memory (RAM) or cache memory in computer 60. Computer 60 also may include internal or external AID conversion circuitry, such as ND converter 38, and an internal or external transducer 25.

Figure 4A:
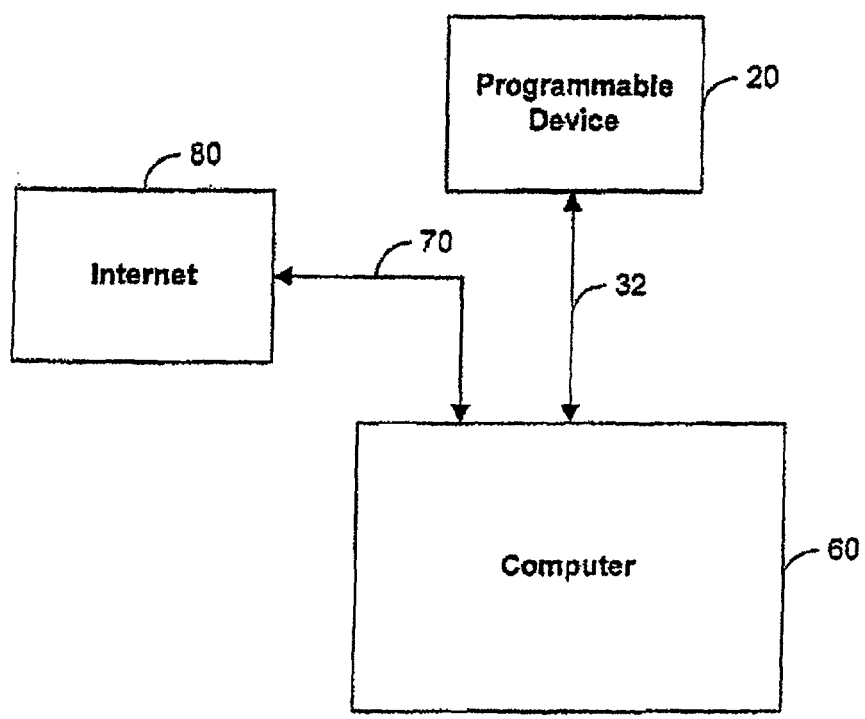
FIG. 4a shows an alternate embodiment of a computer based implementation of a programmer constructed in accordance with the principles of the present invention.

As shown in FIG. 4a, computer 60, programmed to function as programmer 30, may be connected to Internet 80 through link 70 and to device 20 through link 32. This arrangement allows a user to select information from Internet 80 or from a storage device connected to computer 30 (not shown) for programming into device 20.

Figure 4B:
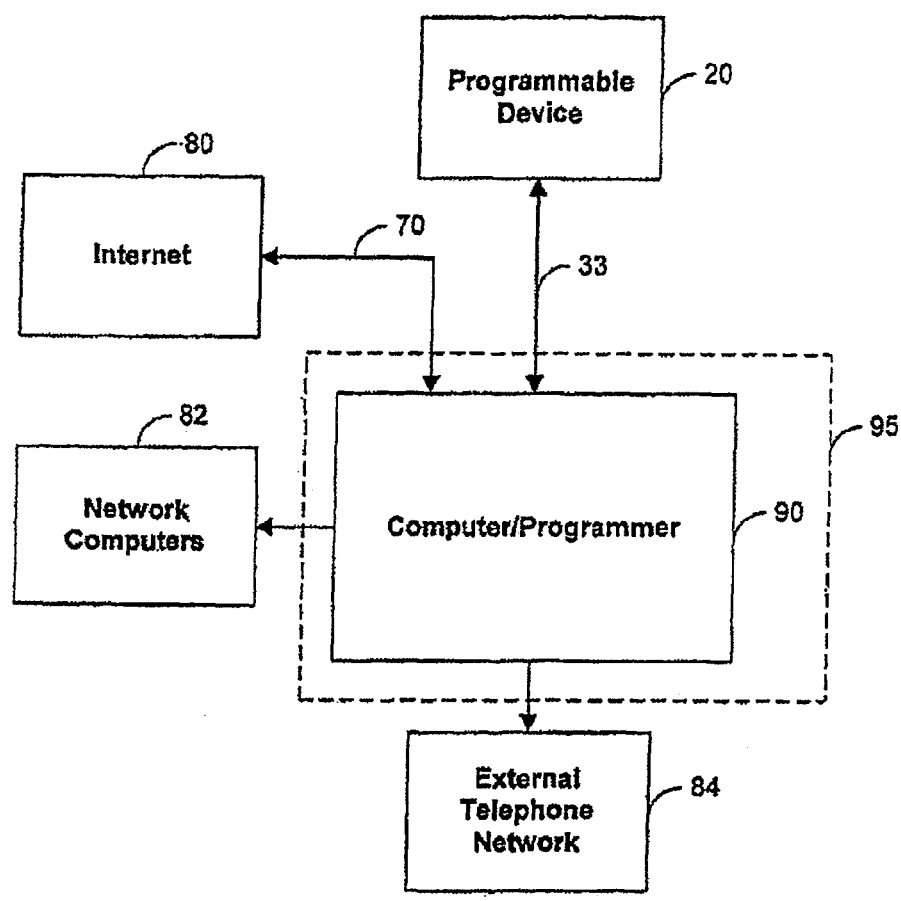

Using the generalized system shown in FIG. 4a, user-defined information may be programmed into device 20 in many ways. For example, computer 60 may be part of a communications network 95, such as a telephone network, that provides Internet and/or telephone access to programmable device 20 (shown in FIG. 4b). Communications network 95 may be provide hard-wired or wireless telephone or Internet access (or combination of the two). This arrangement is generally illustrated in FIG. 4b as architecture 200, in which computer 90, for the sake of clarity, represents computer 60, configured at least in part, to function as programmer 30.

With this configuration, a user of device 20 may access Internet 80 and select information for downloading into device 20. It will be understood, however, that in this implementation, at least a portion of computer 90 is configured to function as programmer 30, and that computer 90 may continue to perform other functions such as communicating with network computers 82, communicating with Internet 80, interfacing with external telephone network 84, and coordinating wireless Internet and telephone access etc., in addition to performing some or all of the above-described programming functions.

In operation, computer 90 may communicate with device 20 to determine its format requirements and perform any conversions necessary to make user-selected information compatible with those requirements. This allows a user to select information, such as audio and/or video, that is available on the Internet or on a remote network computer, and program that information into device 20. This may be accomplished via communications link 33 (which may be any type of link previously described as suitable for link 32). For example, a user may wish to download video images from an Internet site to a hand-held computer, such as a PDA, or to a wireless telephone. The user may communicate with computer 90 via a wireless link 33 and select information from Internet 80 using an Internet browser installed in device 20. Such a browser may be a Wireless Application Protocol (WAP) compliant browser for supporting wireless Internet services. Computer 90 ensures format compatibility of the information, transmits the information to device 20, and may communicate with device 20 to confirm that the selected information has been properly received. Device 20 may provide a visual, audio, or tactile output to indicate the requested information has been successfully received.

Computer 90 may also coordinate information downloading with respect to the memory capacity of device 20. For example, if the user-selected information exceeds the available memory of device 20, computer 90 may inform the user, via link 33, that the selected information is larger than the available memory. hi such an event, the user may be prompted to cancel or modify the information request. In certain instances, however, the user may instruct computer 90 to provide the information in a "scrolling" fashion (i.e., provide it in portions) so that all the requested information may be reviewed, albeit in sections. This may be particularly desirable in instances where large files, such as video files, are requested.

In some embodiments of the present invention, computer 90 may simply contact a remote computer or Internet site to fulfill requests for audio or video information in a particular format. Such web sites or remote computers may act as virtual "jukeboxes" of video and audio information, containing extensive lists of such information in a variety of formats available for downloading. Using this approach, a user may select a particular piece of information in a certain format from a list displayed on a screen of programmable device 20. Computer 90 may receive this as a request via link 33 and handle the information transfer to device 20. In some embodiments, format selection may be transparent to the user. That is, the user may simply request a piece of information and computer 90 may determine and then request information in a format appropriate for the requesting device.

In another embodiment, a remote computer or Internet site may perform a format conversion of information requested by computer 90 or device 20. For example, a user may access an Internet site or remote computer using communications network 95 and enter a title or description of the desired audio or video information along with format requirements. The remote computer or Internet site may then search the Internet or other databases to find a file that matches the user's description. Once this file is found, the Internet site or remote computer may convert that file to the requested format, (using a system similar to the described above) and provide it to device 20 via computer 90 and/or link 33. It will be understood, of course, that embodiments such as these are within the scope of the present invention.

If desired, a user may also employ the systems shown in FIGS. 4a and 4b to download remotely stored information such as Internet access information to device 20. For example, a user may have customized bookmarks or web page addresses stored in a remote personal computer or on Internet 80. The user may employ wireless link 32 or 33 to contact that remote computer or Internet site and then download the Internet access information for use in device 20. This feature is desirable because it relieves the user of the burden of having to type in complicated Internet access information from the small keyboard of a wireless telephone or hand-held computer. It also spares the user from having to re-enter customized Internet information that is already present in another location, into their electronic device. Moreover, such a feature is convenient when a user wishes to access information on a remote computer that is not currently available in device 20. For example, a user may wish to view spreadsheet information stored on a remote computer with device 20. Rather than having to download this information form a hard-wired access point, a user may simply employ wireless link 33 (e.g., a wireless modem or Internet connection) to access that remote computer or Internet site and download that information to device 20.

Another feature which may be implemented using the embodiments shown in FIGS. 4a and 4b is a "signature" feature. This allows device 20 to send user-defined information, which may be indicative of the user's personal taste or identity, along with other information when performing certain functions. For example, if a user is placing a wireless telephone call or paging someone with device 20, he or she may select the signature feature in order to send user-defined audio or video along with, or prior to, that call. A user may accomplish this by browsing through a menu on device 20 that displays available signature options, and by choosing a particular file (not shown). If the user chooses an audio file, for example, device 20 may send that selected audio file when a call or page is placed (or a period of time before the call or page is placed). This audio file may temporarily replace the "ring sequence" of the device receiving the incoming call so that the person receiving the incoming call will be alerted by hearing the audio file sent by the caller. The person receiving the call may be able to discern the identity of the caller or other information from the audio file. After the call is complete, the ring sequence of the receiving device may be returned to its former configuration (either by computer 60 or by the receiving device).

In another embodiment, a user may program certain audio or video files into device 20 that are activated when a certain person calls. For example, a user may program device 20 so that certain signature files are played in response to receiving a characteristic indicative of the caller, such as the caller's telephone number. In this way, a user will be able to identify the caller by the sound and/or display generated by device 20. Users may also program signatures in device 20 to be played at predetermined times. For example, a user (or caller) may program "Happy Birthday" or "Jingle Bells" into device 20 to play on a certain day, or may program device 20 to play a certain signature file at specified time (e.g., as an alarm).

In yet another embodiment, a user, when placing a call, may invoke a menu on device 20, which displays a list of signature files available for the person being called. This list may be defined by the person receiving the call. For example, the person receiving the call may create a signature file list by selecting certain audio and/or video files and placing them in a database of a remote computer such as computer 90 by using, for example, a personal computer connected to the Internet. In some embodiments, signature files may also be stored in a device 20 of the person receiving the call. In this implementation, a list of signature file names may be stored in computer 90 so that a caller may browse the names of signature files stored in the device of the person receiving the call. Signature files may also be stored in a combination of both computer 90 and device 20.

In some embodiments, the signature information may not necessarily be user-defined. For example, a list of pre-selected signature files may stored on computer 90 or a remote computer from which a user of device 20 may choose. Such a list may be created by a wireless service provider, an Internet provider, an Internet site, or a manufacturer of the wireless telephone.

With these implementations, the caller may simply select a signature file from the displayed list. The selected file is then sent along with the call by computer 90 (if the selected signature file is stored in computer 90) or associated with the incoming call at device 20 (if the selected signature file is stored in device 20). In some embodiments, the caller may be able to preview signatures before sending them. For example, computer 90 may send the selected signature file to the caller for his or her review.

In systems that have a video capability, a video file containing a video clip or frame may be sent instead of or in addition to the audio sample. This may be accomplished by selecting a video option from a signature menu and choosing a video file. In this case, the person receiving the call is alerted by seeing or hearing the video clip and/or associated audio. It will be appreciated that a video clip may have its own audio portion associated with it so that the video clip (or frame) by itself would be sufficient to alert the person receiving the incoming call.

The above-described signature feature may be implemented in many ways. In some embodiments, for example, the audio or video signatures may be stored in (the caller's) device 20 and sent along with the outgoing call or page via link 33 and computer 90. In other embodiments, however, the signature information may be stored in computer 90 and associated with the outgoing call when it is processed by computer 90. This type of embodiment may be implemented when it is desired to conserve memory space within device 20. In still other embodiments, signature information may be stored in both device 20 and computer 90. In any case, computer 90 may determine the format requirements of the device receiving the incoming call or page and convert the accompanying signature information into a suitable format.

Figure 5:
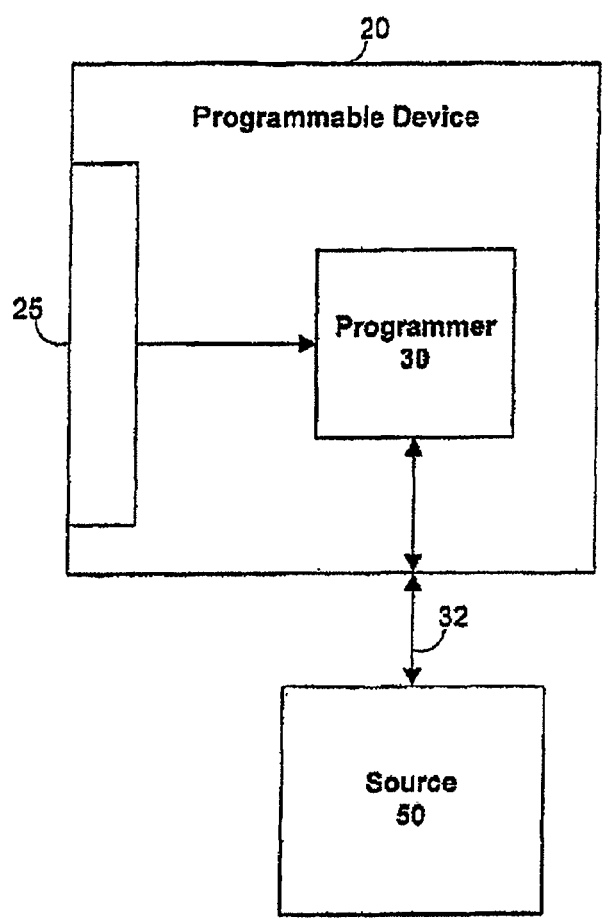
FIG. 5 illustrates an imbedded implementation of the programmer shown in FIG. 2.

Another implementation of a system in accordance with this invention may use an architecture 300, which is shown in FIG. 5. Using this arrangement, programmer 30 (or similar circuitry) may be embedded within programmable device 20. User-defined information may be provided to device 20 from source 50 via link 32. Such information may be routed to programmer 30, which may perform some or all of the above-described functions.

If source 50 is an acoustic source, however, link 32 may not be needed. For example, if a user desires to program an acoustic sound into device 20, the user may place a transducer 25, (e.g., a speaker/microphone existing within or external to device 20) near the acoustic signal source, place device 20 into an "acquisition mode," and record an audio sample. In this case, transducer 25 coverts the acoustic signal into an electrical signal, which is provided to programmer 30 for processing and possibly storage within device 20. A visual, audio, or tactile output may be provided by device 20 to indicate a sample has been successfully loaded. A user may employ transducer 25 to acquire and record, for example, a verbal message or sound effect (e.g., laughter, crying, sneezing, etc.) for use as a signature file.

Figure 6:
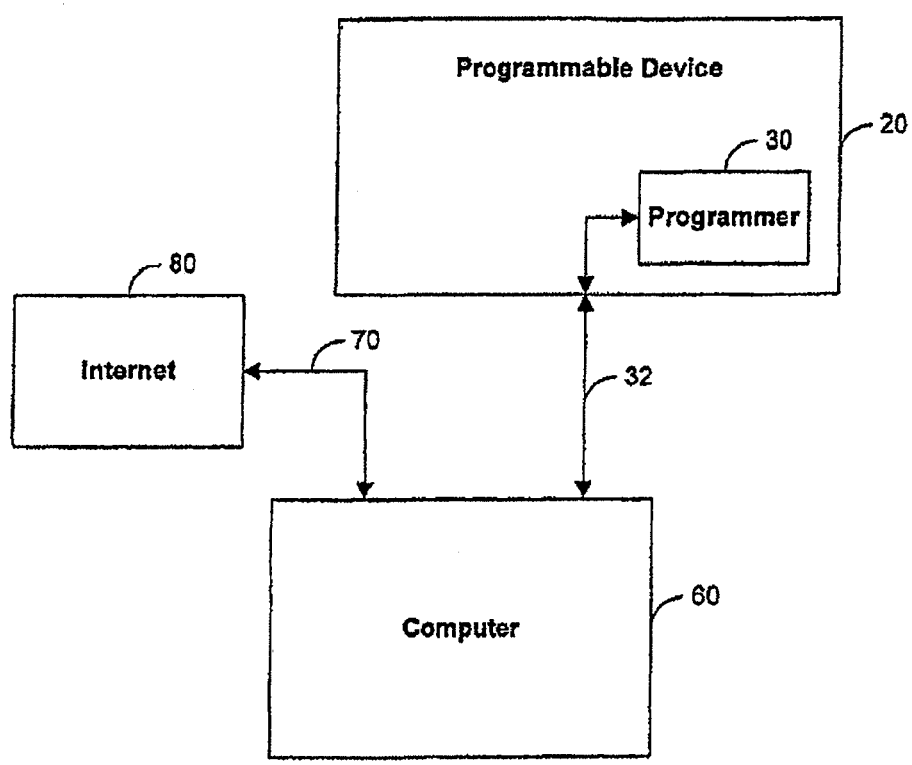
FIG. 6 shows yet another embodiment of a computer based implementation the programmer in shown in FIG. 4b.

Other embodiments of the present invention may use the embedded architecture of system 400 as shown in FIG. 6. Using this arrangement, user-defined information may be requested by device 20 via link 32 and computer 60. With this approach, a user may select information from Internet 80 or a remote computer and perform any necessary format conversion within device 20.

In addition to selecting user-defined information with programmer 30, a user may customize that information by performing various editing procedures. For example, a user may find an audio track or video clip that suits his or her taste. It may be desired, however, to utilize only a portion of that track or clip. In this case, a user may edit or "sample" a portion of the information to obtain the desired segment. For example, a user may wish to sample a few bars of a popular song and send it along as signature information when making a wireless telephone call. Such editing may be accomplished, for example, by using an application program with programmer 30 or by using known software with computer 60. Furthermore, once the user has edited a particular piece of information, he or she may be given the option to review the piece to ensure it is acceptable. When a user is satisfied with an edited segment, he or she may save it and be given an opportunity to "name" that segment, so that it may be readily identified later by a user of device 20.

It will be appreciated that various other types of editing procedures are also possible. For example, a user may combine and/or tither edit the content of segments of information. This may be accomplished using "cut and paste" routines in an application program. Other types of revisions may include modifying the color or content of a portion of video clip or frame, as well as editing the audio track that accompanies a video clip or frame. It may also include revising or combining audio segments or creating customized audio segments to accompany video clips or frames.

In some instances, a user may wish to download large portions of copyrighted audio or video. To prevent improper usage of such material, programmer 30 may include copyright protection software such as software that conforms with the Secure Digital Music Initiative (SDMI). Generally speaking, this may allow an owner of such material to "check out" a finite number of copies so that unauthorized distribution is prevented.

Figure 7:
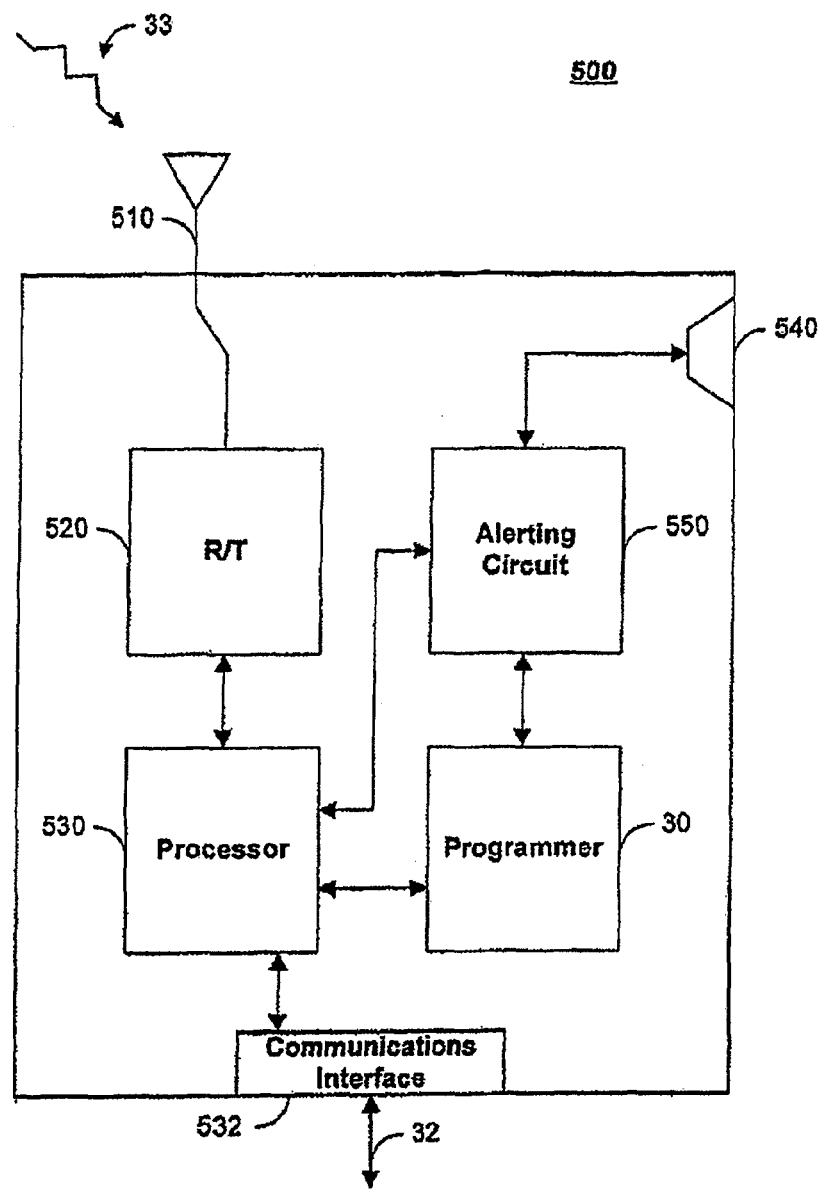
FIG. 7 is a schematic diagram of one possible embodiment of a wireless telephone that can receive and play user-defined audio in accordance with one aspect of the present invention.

A schematic diagram of a portion of a wireless telephone 500 that can receive and play user-defined audio and/or video is shown in FIG. 7. As illustrated in FIG. 7, telephone 500 may include antenna 510, receiver/transmitter (R/T) circuit 520, processor 530, communications interface 532, speaker/transducer 540, alerting circuit 550, and optionally, programmer 30 (or similar circuitry).

A user may program information into telephone 500 in several ways. For example, a user may connect telephone 500 to an external programmer 30 (not shown in FIG. 7) via link 32 to program user-defined audio or video in telephone 500 as described above. Processor 530 may route this information to alerting circuit 550 for storage and subsequent use. Afterwards, the user may configure telephone 500 to play a certain user-defined audio file stored in alerting circuit 550 when receiving an incoming call. Thus, when a call is received, processor 530 may instruct alerting circuit 550 to play the selected file through speaker 540. If a video file is chosen, processor 530 may instruct alerting circuit 550 to play the user-selected video file through a display screen on the telephone (not shown). Alerting circuit 550 may include programmable memory circuitry for storing user-defined information and driver circuitry (not shown) for driving speaker 540 and/or a display screen on telephone 500. Telephone 500 may also receive user-defined information from communications network 95 via link 33 and antenna 510. With this implementation, user defined information, such as a signature file, may be received by antenna 510 and demodulated with R/T circuit 520. Processor 530 may then route the demodulated signals to an appropriate location. In the case of a signature file, for example, processor 530 may check the format of the incoming file to ensure it is compatible with the format required by alerting circuit 550. If the format is compatible, the incoming file may be routed to alerting 550 for storage and subsequent use or to speaker 540 for immediate playing. If the format is not compatible, the incoming file may be routed to programmer 30 for conversion. After conversion is complete, processor 530 may instruct programmer 30 to route the converted file to speaker 540 or alerting circuit 550. If a video file was sent as a signature file, processor 530 may instruct alerting circuit 550 to play the user-selected video file through a display in telephone 500 (not shown). In some embodiments, speaker 540 may be an enhanced performance speaker (as compared to those currently installed in telephones) with a capacity for generating a full range of audio sounds. Moreover, it will be understood that circuitry similar to that shown in FIG. 7 may be installed for use in other communication devices such as PDA's, pagers, notebook computers, etc.

Figure 8:
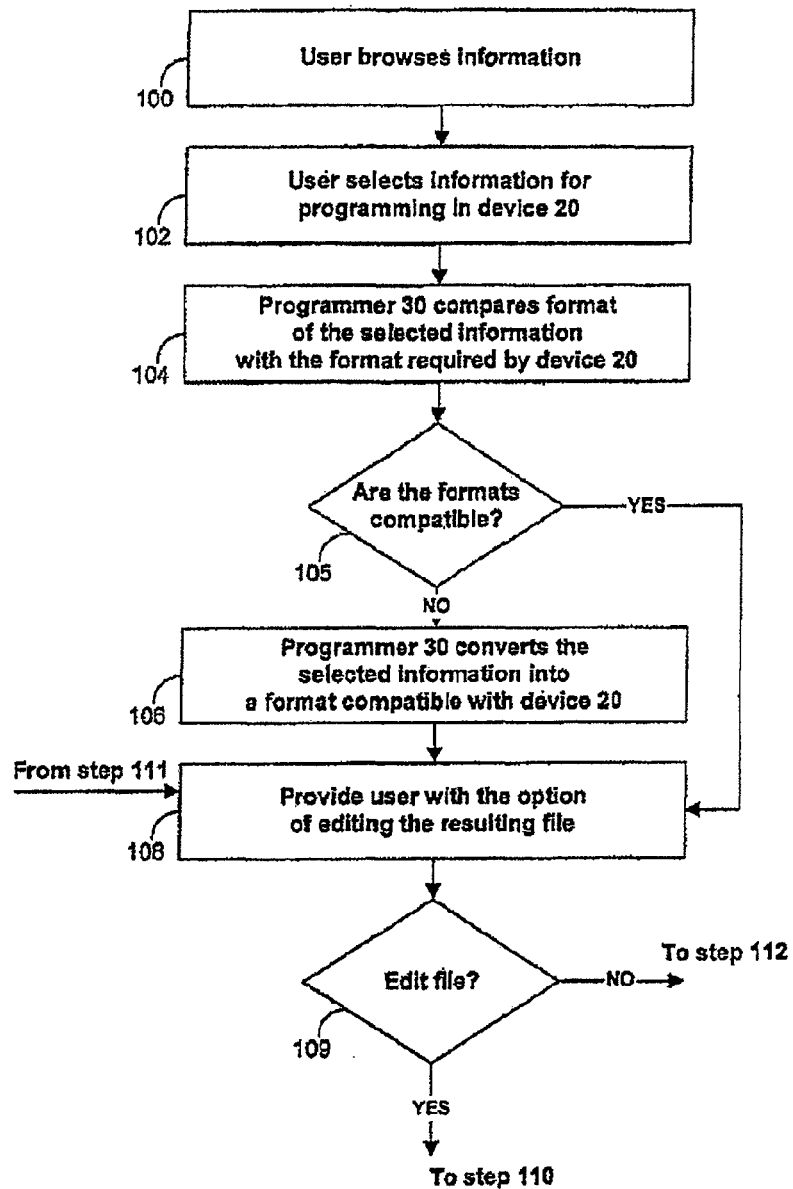
FIGS. 8-9 show a flow chart illustrating some of the steps involved in programming user-defined information into an electronic device in accordance with one embodiment of the present invention.
Figure 9:
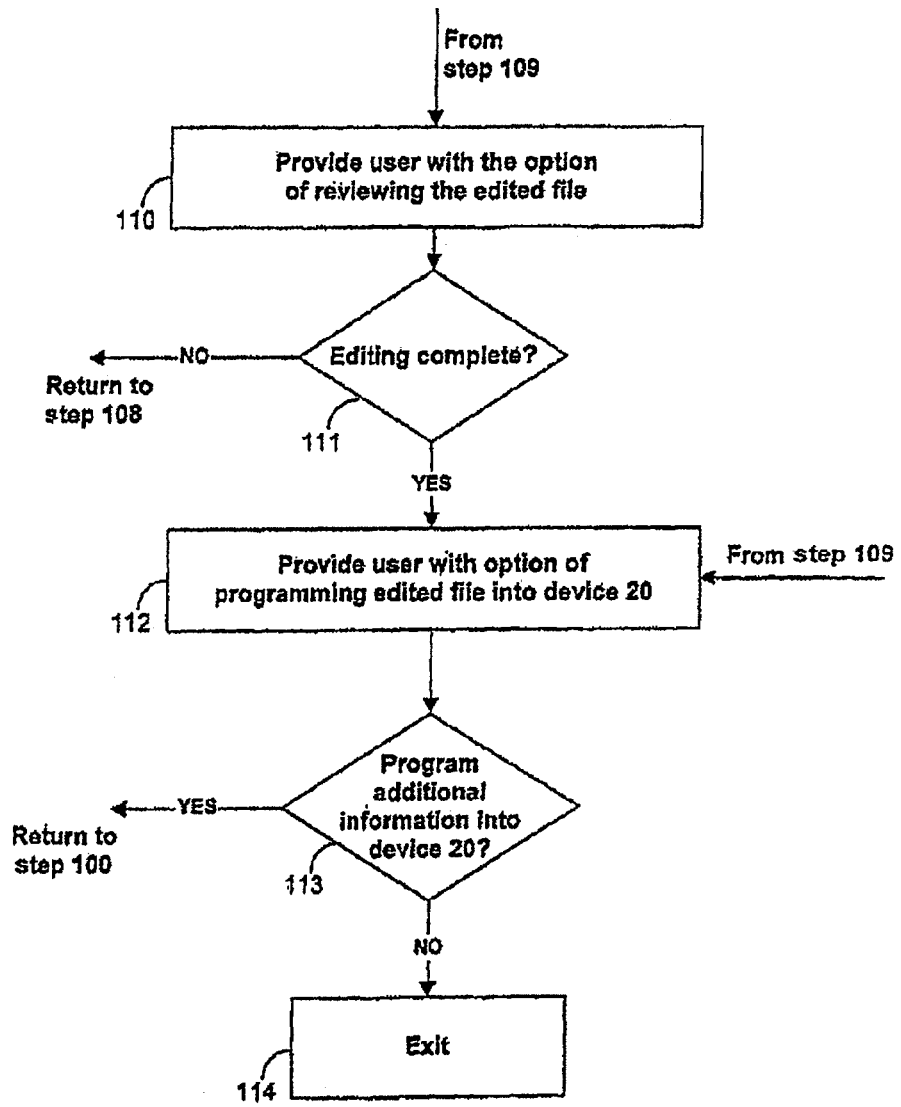

Some of the steps involved in programming user-defined information into programmable device 20 as described herein are illustrated in the flow chart of FIGS. 8-9. It will be understood that although programmer 30 is used in the following description, computer/programmer 90 may also perform some or all of these (or similar) steps.

At step 100 in FIG. 8, programmer 30 allows the user to browse information for potential programming into device 20. As mentioned above, this may include browsing audio/video information on the Internet, or on a hard, floppy, or optical disc drive of a computer. At step 102, the user may choose certain files for programming into device 20. Next, at step 104, programmer 30 may determine the format requirements of device 20 and compare the format of the selected files to that specified by device 20. This may be accomplished, for example, by electronically polling device 20. At step 105, if the formats are compatible, programmer 30 may go directly to step 108. If the formats are not compatible, at step 106, programmer 30 may convert the selected files to a format compatible with device 20. In some embodiments, the user may be prompted to confirm that the conversion should be performed. In addition, programmer 30 may also prompt the user to supply a name for the converted file. Moreover, if the selected file cannot be converted, programmer 30 may so inform the user.

Next, programmer 30 provides the user with an option of editing the contents of the resulting files at step 108. If desired, the user may first review the converted file to determine if editing is warranted. At step 109, if the user chooses not to edit the file, programmer 30 may go directly to step 112 (shown in FIG. 9). If the user decides to edit the file, he or she may do so at step 110. When finished editing, the user may be a given the option of reviewing the file at step 111 by returning to step 108 to determine whether the file is acceptable or requires further revision. Programmer 30 may alternate between steps 108-110 until the user is satisfied with the resulting file. When editing is complete, programmer 30 provides the user with the option of programming the file into device 20 at step 112. At this point, (step 113) the user may exit the program at step 114 or return to step 100 to browse more information.

It will be understood that these steps are merely illustrative, and are not meant to be comprehensive or necessarily performed in the order shown. For example, it may be desired to edit a file already stored in device 20. In this case, a user may bypass steps 100-106 and go directly to step 108. In some embodiments, selected files may be revised before converting them to format compatible with device 20. This may be desirable when the file's original format facilitates the editing process. In addition, programmer 30 may determine the format requirements of device 20 at any time before the conversion occurs. A user may also name or revise the name of a selected file at any time.

Figure 10:
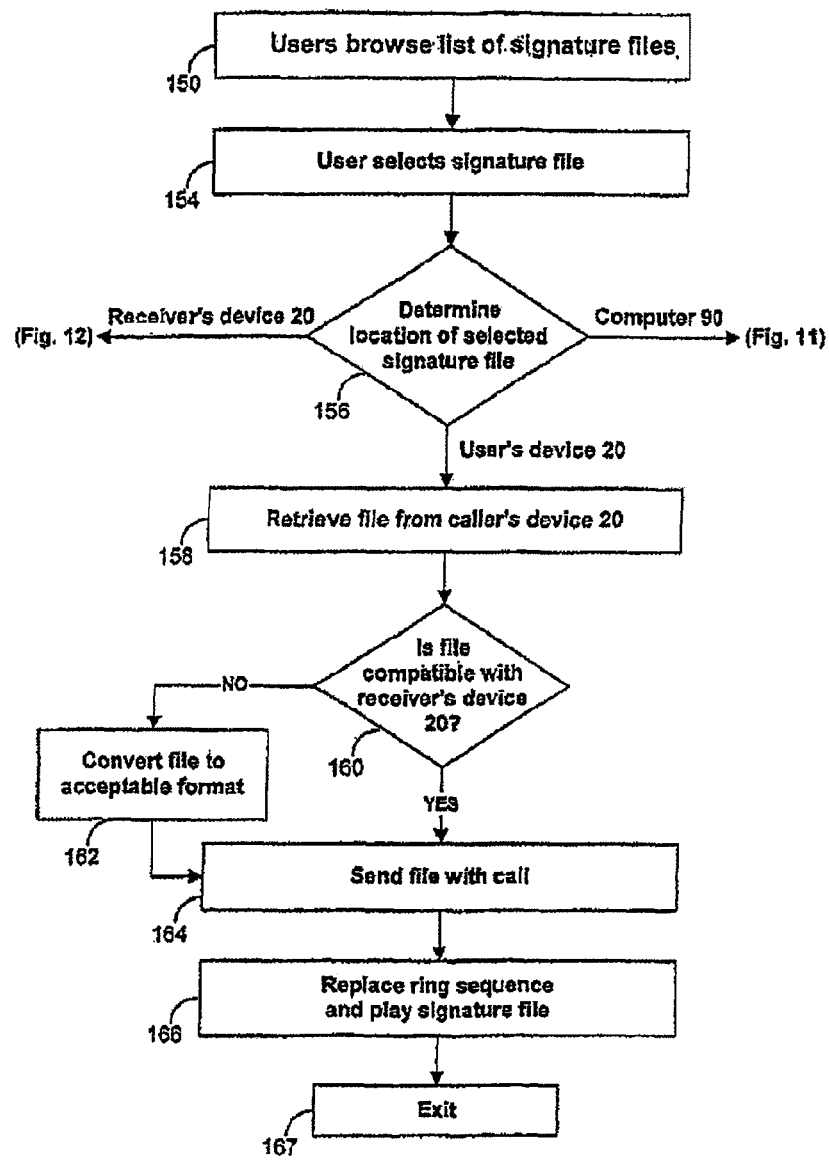
FIGS. 10-12 show a flow chart illustrating some of the steps involved in sending and receiving signature information in accordance with one embodiment of the present invention.
Figure 11:
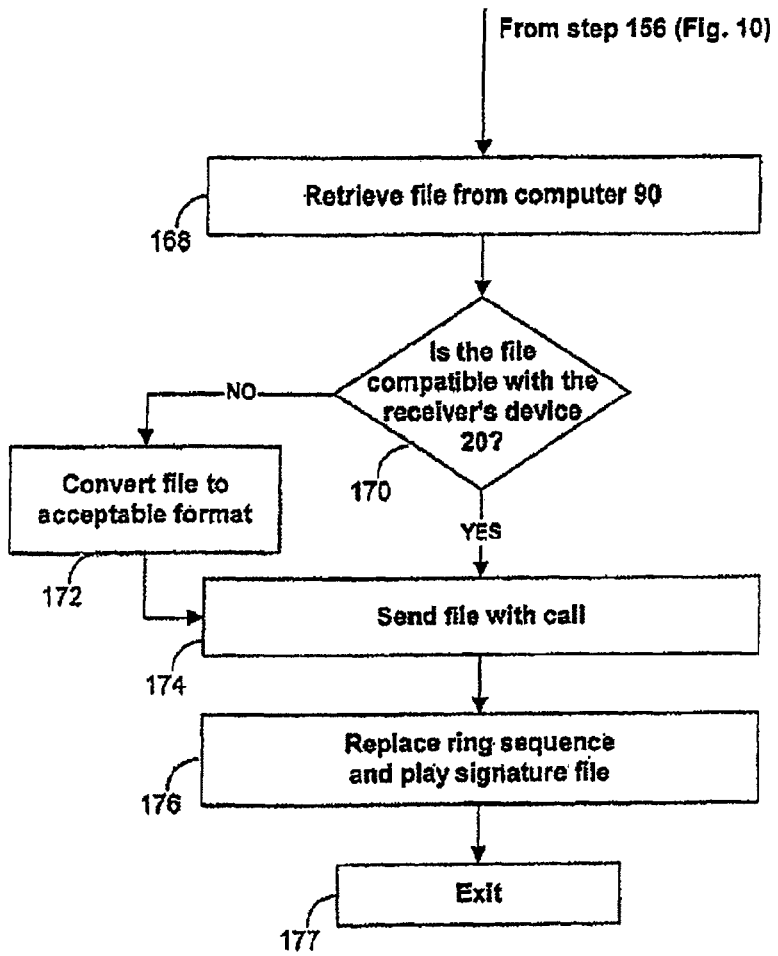
Figure 12:
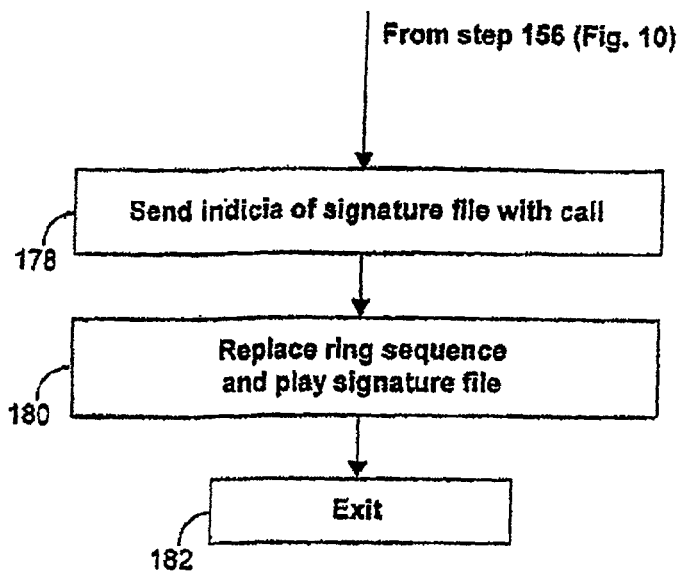

Some of the steps involved in sending signature files to programmable device 20 as described herein are illustrated in the flow chart of FIGS. 10-12.

At step 150 in FIG. 10, device 20 allows the user to browse signature files for potential transmission to device 20 of the person receiving the call (hereinafter the "receiver"). At step 150, the user may be provided with option of creating a new signature file if a suitable signature file not found on the list. At step 154 the user may select a signature file. Once a signature file is selected, computer 90, at step 156, may determine the location of the selected signature file. Such locations may include, but are not limited to, the caller's device 20, the receiver's device 20, or computer 90.

If computer 90 determines that the signature file is located in the user's device 20 (i.e. the caller's device 20) computer 90 may retrieve that file from the user's device 20 at step 158. Next, computer 90 may compare the format requirements of the receiver's device 20 with the format of the retrieved file to determine if they are compatible at step 160. If the formats are compatible, computer 90 may go directly to step 164. If the formats are not compatible, computer 90 may convert the signature file to an acceptable format at step 162. At step 164, the signature file may be sent along with, or somewhat before, the outgoing call. At step 166, the receiver's device 20 may replace its ring sequence with the signature file and play the signature file. At step 167, the receiver's ring sequence may be returned to its original setting and the program may exit.

If, however, the signature file is located in computer 90 (step 156), computer 90 may retrieve that file at step 168 (FIG. 11). Next, computer 90 may compare the format requirements of the receiver's device 20 with the format of the retrieved file to determine if they are compatible at step 170. If the formats are compatible, computer 90 may go directly to step 174. If the formats are not compatible, computer 90 may convert the signature file to an acceptable format at step 172. At step 174, the signature file may be sent along with, or somewhat before, the outgoing call. At step 176, the receiver's device 20 may replace its ring sequence with the signature file and play the signature file. At step 177 the receiver's ring sequence may return to its original setting and the program may exit.

On the other hand, if computer 90 determines at step 156 that the signature file is located in the receiver's device 20, computer 90 may transmit an indicia indicative of the selected file to the receivers device 20 along with the outgoing call at step 178 (FIG. 12). Next, the receiver's device 20 may associate a signature file that corresponds to the indicia, replace its ring sequence with that signature file, and play that signature file at step 180. At step 182, the receiver's ring sequence may be returned to its original setting and the program may exit. It is assumed for the purposes of this illustration that signatures files stored in the receiver's device 20 are already in a suitable format. However, if this is not the case, a conversion step may be added between step 178 and step 180 (not shown).

It will be understood that these steps are merely illustrative, and are not meant to be comprehensive or necessarily performed in the order shown. For example, computer 90 may determine the format requirements of device 20 at any time before the conversion occurs.

Thus, it is seen that a device for programming user-defined information into an electronic device is provided. The programmer allows a user to program customized information, such as audio, video, or Internet access information into his or programmable device. This allows a user to, among other things, customize his or her device to suit the user's particular taste. It will be understood that the foregoing is only illustrative of the principles of the invention, and that various modifications can be made by those skilled in the art without departing from the scope and spirit of the invention. For example, it is not necessary that programmable memory within device be a fixed programmable memory. That is, a removable memory module may be programmed externally from a given programmable device and subsequently installed in that device. Furthermore, the many aspects of the invention are suitable for use with hard-wired, cordless, or wireless communications devices. For example, user-defined audio and video and signature files may be used with hard-wired or cordless telephone systems. Accordingly, such embodiments will be recognized as within the scope of the present invention.

Persons skilled in the art will appreciate that the present invention can be practiced by other than the described embodiments, which are presented for purposes of illustration rather than of limitation, and the present invention is limited only by the claims which follow.

What is claimed is:

1. A method of providing a video file to a communications device, the method comprising:
   receiving an electronic request from the communications device that identifies at least one video file in a listing of video files, wherein the at least one video file is available in two or more different digital formats;
   automatically identifying with computer hardware comprising one or more computer processors, at least one digital format that is compatible with the communications device;

comparing the digital format that is compatible with the communications device with the two or more different digital formats of the at least one video file to identify at least a first compatible digital format; and transferring to the communications device, the at least one video file in at least the first compatible digital format.

2. The method of claim 1 wherein automatically identifying the at least one digital format that is compatible with the communications device is transparent to a user of the communications device.

3. The method of claim 1 wherein automatically identifying the at least one digital format that is compatible with the communications device comprises polling the communications device to automatically identify the first compatible digital format.

4. The method of claim 1 wherein the communications device is a wireless communications device.

5. The method of claim 1 wherein the first compatible digital format of the at least one video file is at least one of the group consisting of: JPEG, MPEG, GIF, and AVI.

6. The method of claim 1 further comprising allowing the user to search for the at least one video file.

7. The method of claim 1 wherein the at least one video file is configured to be used as an indicia of an incoming communication.

8. A system that provides a video file to a communications device, the system comprising:

one or more computer processors configured to receive an electronic request from the communications device that identifies at least one video file in a listing of video files, wherein the at least one video file is available in two or more different digital formats;

one or more computer processors configured to automatically identify at least one digital format that is compatible with the communications device;

one or more computer processors configured to compare the digital format that is compatible with the communications device with the two or more different digital formats of the at least one video file to identify at least a first compatible digital format; and one or more computer processors configured to transfer to the communications device, the at least one video file in at least the first compatible digital format.

9. The system of claim 8 wherein automatically identifying the at least one digital format that is compatible with the communications device is transparent to a user of the communications device.

10. The system of claim 8 wherein automatically identifying the at least one digital format that is compatible with the communications device comprises polling the communications device.

11. The system of claim 8 wherein the communications device is a wireless communications device.

12. The system of claim 8 wherein the digital format of the at least one video file is at least one of the group consisting of: JPEG, MPEG, GIF, and AVI.

13. The system of claim 8 wherein one or more computer processors are configured to allow the user to search for the at least one video file.

14. The system of claim 8 wherein the at least one video file is configured for use as an indicia of an incoming communication.

* * * * *